Figure 1:
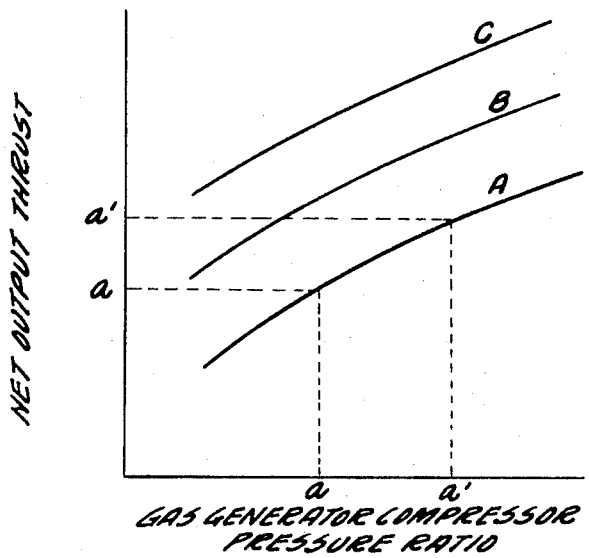

Sept. 20, 1966  T. N. HULL, JR  3,273,340
GAS TURBINE POWERPLANT HAVING AN EXTREMELY
HIGH PRESSURE RATIO CYCLE
Filed Nov. 22, 1963  2 Sheets-Sheet 1

INVENTOR.
THOMAS N. HULL, JR.
BY
George R. Powell
ATTORNEY

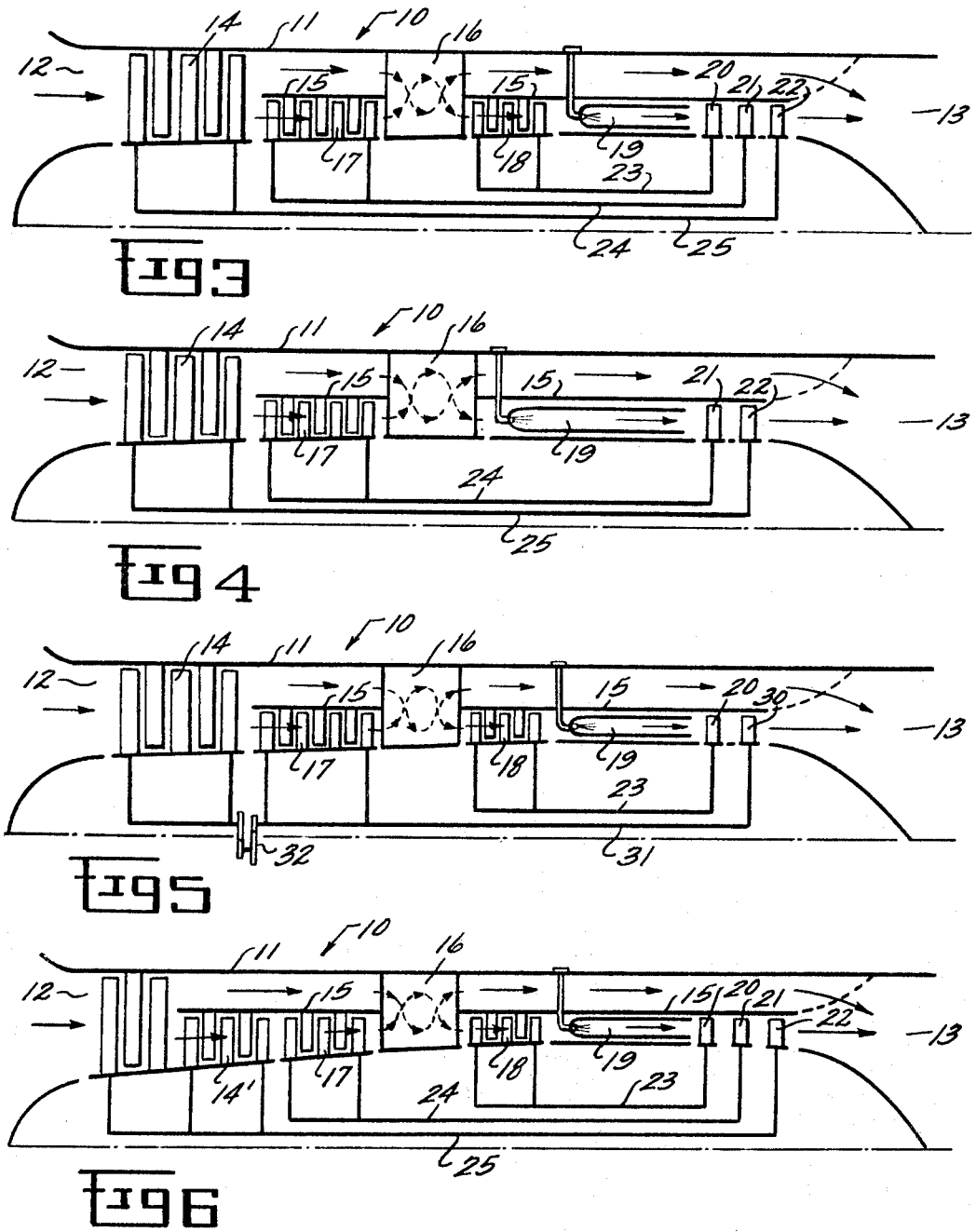

United States Patent Office 3,273,340
Patented Sept. 20, 1966

3,273,340
GAS TURBINE POWERPLANT HAVING AN EXTREMELY HIGH PRESSURE RATIO CYCLE
Thomas Neil Hull, Jr., Marblehead, Mass., assignor to General Electric Company, a corporation of New York
Filed Nov. 22, 1963, Ser. No. 325,587
1 Claim. (Cl. 60—39.16)

This invention relates to gas turbine powerplants and, more particularly, to an improved arrangement for gas turbine engines of the bypass or turbofan type, the structural arrangement of this invention providing an extremely high pressure ratio cycle characterized by a relatively low compressor discharge temperature.

A jet propulsion powerplant used for propelling an airplane achieves its maximum efficiency when the forward velocity of the airplane approaches as nearly as possible the velocity of the propulsion jet relative to the airplane. Under such conditions, relatively little excess energy is dissipated in the atmosphere since the products of combustion are discharged with low absolute velocity. A conventional jet engine, which exhausts its high temperature products of combustion as a high velocity jet, is thus most efficient when used to propel an airplane at high speeds. The inefficiency of the conventional jet engine when propelling an airplane at relatively low speeds is due to the discharge of the products of combustion with greater absolute velocity, a substantial amount of excess energy thereby being dissipated in the atmosphere. It has been found that both the efficiency and thrust of the engine at low speeds can be increased substantially by means of a thrust augmenter. A thrust augmenter increases the effective total momentum of the propulsion jet by increasing the mass flow and decreasing the velocity of the propulsion jet. In operation, a thrust augmenter extracts energy, and consequently velocity, from the products of combustion and uses the extracted energy to accelerate engine bypass air. A net increase in thrust results since the increase in total mass flow more than compensates for the decrease in velocity of the propulsion jet. The amount of increase in thrust depends in large part upon the bypass ratio, which is the ratio of the mass of bypass air to the mass of combustion products. As the bypass ratio increases, the available thrust increases and the velocity of the propulsion jet decreases.

The bypass ratio is not, however, the only factor which determines the net thrust of a bypass or turbofan engine. It is also known that increased thrust at various bypass ratios can be obtained in theory by increasing the pressure ratio of the gas generator compressor or, in other words, by compressing the motive fluid to a higher pressure. The pressure ratio cannot, however, be increased without limit since there are practical considerations which generally dictate the maximum pressure ratio compressor for a given engine design. For example, when a high pressure ratio compressor is used, compressor stall may occur under part load operation or under various other operating conditions such as during engine acceleration, such operation being known as "off-design" operation. Compressor stall is a condition which exists when the pressure ratio across the compressor is greater than the compressor is capable of maintaining. To alleviate this condition in the lower portions of the operating speed range, it is possible to vary the engine fluid flow characteristics to correspond to the operating speed of the engine. One way this can be accomplished is by means of mounting the compressor rotor stages on two or more independently rotated rotors, the high pressure stages being rotated at higher speeds than the low pressure stages during part power operation. Even where the compressor stall problem is alleviated by varying the fluid flow characteristics at the off-design operating conditions, the maximum compressor pressure ratio can still be limited by the high temperature capabilities of the turbine elements. This limitation will become obvious by recognizing that the motive fluid is subjected to isentropic compression. As a result, the temperature of the motive fluid discharged from the compressor increases with increasing pressure ratios. With typical high pressure ratio compressors, the compressor discharge temperature can be sufficiently high to limit severely the amount of energy which can be added to the motive fluid during the combustion process without producing temperatures which exceed the temperature capabilities of the turbine elements. It will therefore be obvious to those skilled in the art that turbine temperature limitations, combined with the characteristics of the combustion process, can dictate the maximum pressure ratio which may be practicably attained.

An object of this invention is to provide a high pressure ratio gas turbine engine having high net thrust and efficiency.

A further object of this invention is to provide an improved gas turbine engine of the bypass or turbofan type providing high thrust and efficiency without exceeding the high temperature capabilities of the turbine elements or the pressure ratio capabilities of the engine compressor during off-design operation.

A still further object of this invention is to provide a gas turbine engine having high thrust efficiency which is simple in design, relatively easy to manufacture, and both economical and reliable to operate.

Briefly stated, in accordance with the illustrated embodiments of the invention, the foregoing and other objects are attained by providing a gas turbine powerplant of the bypass or turbofan type with a heat exchanger in which relatively cool bypass air is used to cool higher temperature compressed air, the cooled air then being supplied to the powerplant combustor. Cooling the compressed air makes possible the use of an extremely high pressure ratio compressor without exceeding the maximum temperature capabilities of the turbine elements. More particularly, a gas turbine powerplant is provided with at least two compressors, the first being connected to the engine inlet. Two ducts are connected to the discharge side of the first compressor from which each receives a portion of the total flow of motive fluid and ultimately supplies the fluid to the engine outlet. The first of the ducts defines a bypass passage, the duct directing the fluid through a heat exchanger prior to delivering it to the outlet. The second of the ducts defines the main flow passage of the engine, the duct serially directing the motive fluid through at least one additional compressor, the heat exchanger in which it is passed in heat exchange relation with the bypass fluid in the first duct, the engine combustor, and at least one turbine prior to delivering the fluid to the engine outlet.

Figure 2:
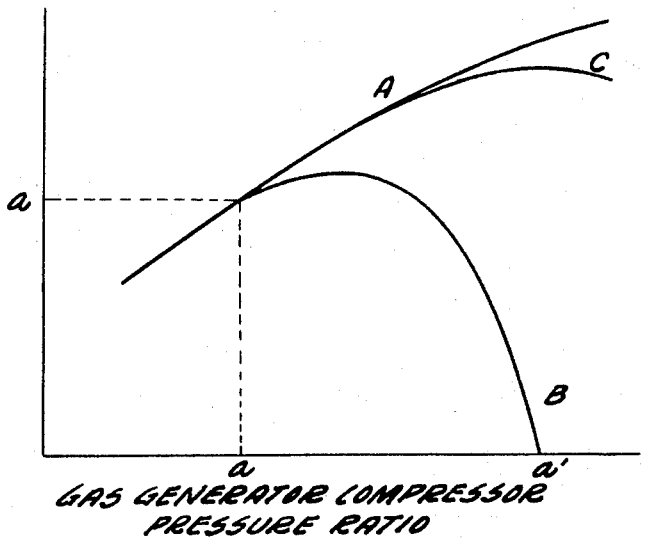

While the invention is distinctly claimed and particularly pointed out in the claims appended hereto, the invention, both as to organization and content, will be better understood and appreciated, along with other objects and features thereof, from the following detailed description when taken in conjunction with the drawings, in which:

FIG. 1 is a graph showing theoretical variation in net output thrust with compressor pressure ratio for turbofan engines having various bypass ratios; and FIG. 2 is a graph illustrating how the actual variations in net output thrust with compressor pressure ratio for actual turbofan engines compare with the theoretical curves of FIG. 1; and FIG. 3 is a schematic side view of a turbofan engine utilizing the improved cycle of this invention; and FIGS. 4–6 illustrate alternative gas turbine arrangements which utilize the invention.

FIG. 1 illustrates the manner in which the net output thrust which can be obtained theoretically from a bypass or turbofan engine varies with changes in the pressure ratio across the gas generator compressor, each of the curves representing a constant bypass ratio. As illustrated, curve A represents a constant bypass ratio, curve B a higher bypass ratio, and curve C a still higher bypass ratio. From the graph, it will be seen that a turbofan engine having a compressor pressure ratio of $a$ and a bypass ratio determined by curve A can produce a net thrust of $a$ measured along the vertical axis of the graph. By increasing the gas generator pressure ratio to $a'$, the net thrust is increased to the value represented by $a'$ on the vertical axis. From FIG. 1, it would therefore appear that it is a simple matter to increase output thrust of a turbofan engine by going to ever higher pressure ratios. In practice, however, it is found that the attainable net output thrusts of actual turbofan engines vary significantly from theoretical values at high pressure ratios. This actual variation is illustrated by FIG. 2.

Referring now to FIG. 2, curve A represents the net thrust theoretically obtainable at various compressor pressure ratios for a turbofan engine having a constant bypass ratio. In other words, curve A corresponds to one of the curves of FIG. 1. Curve B represents the actual variation in net output thrust with compressor pressure ratio for an actual turbofan engine having the same bypass ratio and not utilizing the improved thermodynamic cycle of the present invention. It will be noted from the graph that curve B corresponds very closely with the theoretical curve A at relatively low pressure ratios. At higher pressure ratios, however, the net output thrust drops off rapidly, the reason for the decrease in thrust being the practical temperature limitations discussed above. At pressure ratios of less than $a$, the maximum possible amount of heat can be added in the engine combustor without producing temperatures which exceed the maximum temperatures which the various turbine elements are capable of withstanding. At pressure ratios greater than $a$, however, the isentropic compression process produces temperatures sufficiently high to require that the amount of energy added in the combustor be limited. The amount of heat which can be added in the combustor thus decreases with increasing pressure ratio. At a compressor pressure ratio of $a'$, the compressor discharge temperature is almost as high as the maximum allowable turbine inlet temperature. This means that very little energy can be added in the combustor; in fact, at $a'$, the energy added is sufficient to supply losses only. As a result, there is no net output thrust at the pressure ratio $a'$. It will be obvious to those skilled in the art that the pressure ratio cannot be increased above that represented by $a'$ in an actual turbofan engine of the type illustrated by curve B since such an engine cannot even be self-sustaining at such a pressure ratio without producing temperatures which exceed the maximum temperatures the turbine elements are capable of withstanding.

The turbofan arrangement of this invention makes possible the use of an extremely high pressure ratio engine without producing extremely high compressor discharge temperatures which would severely limit the amount of heat added in the combustor. In accordance with the present invention, the compressed fluid is cooled in a heat exchanger prior to being supplied to the combustor at a high pressure. As a result of the cooling, more energy can be added by the combustion process at high pressure ratios without producing excessive temperatures. The overall cycle efficiency is not, however, adversely affected since the present invention uses the turbofan bypass fluid to cool the high temperature compressed motive fluid, the heat removed from the compressed fluid increasing the energy of the bypass fluid, which is mixed with the hot combustion products issuing from the turbine to produce the total propulsive thrust. Curve C of FIG. 2 illustrates the variation in net output thrust with pressure ratio for a turbofan constructed in accordance with the present invention. It will be noted that curve C corresponds closely with the theoretical curve A over a much broader range of pressure ratios than the curve B representing the thrust variation of prior art turbofan engines.

It will be obvious to those skilled in the art that a number of various arrangements of engine components can be used to practice the invention. The invention will be described in detail with respect to FIG. 3, which schematically illustrates a preferred embodiment of the invention. As illustrated by FIG. 3, a turbofan engine 10 has a cylindrical outer casing 11 having an inlet opening 12 at one end and an outlet opening 13 at the other end. A first compressor 14 is mounted within the casing 11 adjacent the inlet 12 and receives a stream of motive fluid therefrom. The compressor 14 actually functions as a fan rather than as a true compressor since it accelerates the motive fluid only and does not reduce the flow area. On the discharge side of the compressor 14, an inner casing 15 concentric with the engine casing 11 divides the motive fluid into an outer stream and an inner stream. The outer stream of high velocity motive fluid comprises the bypass stream and is directed by bypass ducting means through a heat exchanger 16 prior to being supplied to the engine outlet 13. The inner stream comprising the main stream of motive fluid for the engine is supplied to a second compressor 17 in which its pressure and temperature are increased substantially. The inner ducting means directs the motive fluid discharged from the compressor 17 through the heat exchanger 16 in heat exchange relation with the bypass fluid in the outer duct, after which the cooled motive fluid is supplied to a third compressor 18 in which its pressure is raised still further. From the third compressor 18, the motive fluid is supplied to the engine combustor 19 within which combustion occurs. Because of the cooling the inner motive fluid stream in the heat exchanger 16, the fluid supplied to the combustor 19 is at a much lower temperature than it would be in prior art turbofan engines having the same pressure ratio and not utilizing the present invention. As a result, complete combustion in the combustor can occur at much higher pressure ratios without producing excessive turbine inlet temperatures. The overall efficiency is not materially affected since the energy extracted from the inner stream is not lost to the cycle, but increases the energy of the bypass stream and thus still produces thrust.

From the combustor 19, the combustion products are supplied to first, second, and third turbines 20, 21, and 22, respectively. The first turbine 20 drives the third compressor 18, the second turbine 21 drives the second compressor 17, and the third turbine 22 drives the first compressor 14 through concentric outer, intermediate, and inner drive-shafts 23, 24, and 25, respectively. After passing through the turbines 20, 21, and 22, the combustion products are supplied to the engine outlet 13 for mixing with the bypass fluid and producing output thrust.

Since the three compressors 14, 17 and 18 are independently mounted and rotated, the engine can be designed such that the compressors are rotated at different speeds. In this manner, the fluid flow characteristics can be controlled during off-design operation. Therefore, extremely high pressure ratios can be attained without introducing significant compressor stall difficulties.

In the foregoing discussion, the heat exchanger 16 has not been described in detail. This has been done by design since many different forms of heat exchangers can be used in practicing the invention, the only requirement being that the bypass fluid be used to cool the main stream of high temperature compressed motive fluid. In practice, however, the heat exchanger 16 is preferably annular.

The fluids can be passed through the heat exchanger in essentially parallel paths as illustrated. If desired, however, alternative flow arrangements can be used for providing more effective heat transfer. For example, each of the streams could be directed through the heat exchanger twice in radial counterflow passes. It is thus essential that there be two sets of independent passages disposed in heat exchange relationship within the heat exchange, the bypass fluid flowing through one set of passages and the compressed fluid flowing through the other set of passages.

As pointed out previously in this description, it will occur to those skilled in the art that alternative structural arrangements of engine components can be utilized to practice the invention. Three such alternative arrangements are illustrated by FIGS. 4, 5, and 6. In view of the detailed description of the powerplant illustrated by FIG. 3, these arrangements will not be described at length. For the most part, the departures only from the turbofan engine of FIG. 3 will be pointed out, the components similiar to components of the engine of FIG. 3 being indicated by similar numerals.

Turning now to FIG. 4, it will be noted that the illustrated turbofan engine differs from the engine 10 of FIG. 3 only in that the third high pressure compressor 18, its driving turbine 20, and connecting driveshaft 23 have been deleted. In the engine of FIG. 4, the high temperature compressed air discharged from the compressor 17 is cooled by the bypass fluid prior to being supplied to the combustor 19. In view of the foregoing discussion, it will be obvious that the engine illustrated can safely operate at higher pressure ratios than prior art turbofan engines not equipped with the bypass heat exchanger 16.

The turbofan engine illustrated by FIG. 5 is substantially identical to the engine of FIG. 3 except in that both the first compressor 14 and the second compressor 17 are driven by a single turbine 30 through a driveshaft 31. A gear reducer 32 is provided between the two compressors so that the first compressor 14 can be driven at a slower speed than the second compressor 17. It will also be obvious that all three compressors could be driven by a single turbine if desired.

Referring now to FIG. 6, an alternative first compressor 14' is illustrated in which the first few rotor stages have enlongated blades whose outer extremities act as a fan for the bypass duct. The downstream stages are shorter and compress the motive fluid flowing through the powerplant's inner stream.

It will thus be seen that the turbofan engine arrangements just described are capable of producing high net output thrust and efficiency at extremely high pressure ratios since motive fluid is supplied to the engine combustor at a relatively low temperature. As a result, complete combustion can be maintained at high pressure ratios without producing excessive turbine inlet temperatures.

As pointed out previously, other embodiments of the invention may be utilized. Therefore, while particular embodiments of the invention have been shown and described, it will be understood that it is intended to cover in the appended claim all modifications and changes which may be made without departing from the spirit and scope of the invention.

What is claimed as new and desired to secure by Letters Patent of the United States is:

A gas turbine powerplant comprising, in combination:
(a) an inlet for admitting motive fluid into said powerplant and an axially spaced outlet for exhausting the motive fluid from said powerplant;
(b) a first axial flow compressor connected to said inlet for receiving motive fluid therefrom;
(c) first and second ducting means defining independent concentric annular axially extending flow passageways connecting the outlet of said first axial flow compressor to said powerplant outlet, each of said ducting means arranged to receive a portion of the total flow of motive fluid from said first compressor, the passageway defined by said first ducting means surrounding the passageway defined by said second ducting means;
(d) second and third axial flow compressors;
(e) a heat exchanger having first and second sets of independent passages therein, said first set of passages forming a portion of said first ducting means and said second set of passages forming a portion of said second ducting means, said first and second sets of pasages being disposed in heat exchange relationship;
(f) a combustor;
(g) first, second, and third axial flow turbines;
(h) an outer driveshaft, said first turbine and said third compressor mounted on said outer driveshaft for rotation therewith;
(i) an intermediate driveshaft concentrically mounted within said outer driveshaft, said second turbine and said second compressor mounted on said intermediate driveshaft for rotation therewith;
(j) an inner driveshaft concentrically mounted within said intermediate-driveshaft, said third turbine and said first compressor mounted on said inner driveshaft for rotation therewith;
(k) said first ducting means connecting said first compressor, said heat exchanger, and said powerplant outlet in serial flow arrangement, and said second ducting means connecting said first compressor, said second compressor, said heat exchanger, said third compressor, said combustor, said first turbine, said second turbine, said third turbine, and said powerplant outlet in serial flow arrangement;
(l) whereby the motive fluid in said first ducting means is heated and the motive fluid in said second ducting means is cooled as a result of heat transfer therebetween in the passages of said heat exchanger.

References Cited by the Examiner

UNITED STATES PATENTS

| 2,430,398 | 11/1947 | Heppner | 60—35.6 |
|---|---|---|---|
| 2,430,399 | 11/1947 | Heppner | 60—35.6 |
| 2,465,099 | 3/1949 | Johnson | 60—35.6 |
| 2,588,532 | 3/1952 | Johnson | 60—35.6 |
| 2,638,744 | 5/1953 | Price | 60—39.33 |
| 2,803,943 | 7/1957 | Rainbow | 60—35.6 |

FOREIGN PATENTS

| 994,130 | 7/1951 | France. |
|---|---|---|
| 793,316 | 4/1958 | Great Britain. |

MARK NEWMAN, *Primary Examiner.*

CARLTON R. CROYLE, *Examiner.*